United States Patent [19]
Klapper et al.

[11] Patent Number: 5,763,882
[45] Date of Patent: Jun. 9, 1998

[54] LOW COST NIGHT VISION CAMERA

[75] Inventors: Stuart H. Klapper, Rancho Palos Verdes; Lacy G. Cook, El Segundo, both of Calif.

[73] Assignee: Hughes Aircraft Company, Los Angeles, Calif.

[21] Appl. No.: 751,393

[22] Filed: Nov. 18, 1996

Related U.S. Application Data

[63] Continuation of Ser. No. 232,893, Apr. 12, 1994, abandoned.

[51] Int. Cl.$^6$ .................... G01J 5/04; G01J 5/08
[52] U.S. Cl. ................ 250/332; 250/350; 250/353
[58] Field of Search .................. 250/330, 332, 250/349, 353, 338.3, 338.2, 334, 352, 33, 364, 365, 366, 350, 351; 359/859, 861

[56] References Cited

U.S. PATENT DOCUMENTS

| | | | |
|---|---|---|---|
| 3,610,930 | 10/1971 | Lacy et al. | 250/332 |
| 3,617,107 | 11/1971 | Chu | 359/364 X |
| 3,886,360 | 5/1975 | Reiss et al. | 250/353 X |
| 4,142,207 | 2/1979 | McCormack et al. | 250/332 X |
| 4,277,804 | 7/1981 | Robison . | |
| 4,719,350 | 1/1988 | Alm | 250/330 |
| 4,804,258 | 2/1989 | Kebo . | |
| 4,806,761 | 2/1989 | Carson et al. | 250/334 X |
| 4,950,896 | 8/1990 | Liebson | 250/332 X |
| 5,001,558 | 3/1991 | Burley et al. . | |
| 5,021,663 | 6/1991 | Hornbeck | 250/349 |
| 5,114,238 | 5/1992 | Sigler | 359/366 X |
| 5,173,801 | 12/1992 | Cook | 359/861 X |
| 5,331,470 | 7/1994 | Cook | 359/859 |
| 5,379,157 | 1/1995 | Wang | 359/861 |
| 5,414,439 | 5/1995 | Groves et al. . | |
| 5,554,847 | 9/1996 | Salvio et al. | 250/332 |

FOREIGN PATENT DOCUMENTS

| | | | |
|---|---|---|---|
| 0-640903 | 3/1995 | European Pat. Off. . | |
| 0-677955 | 10/1995 | European Pat. Off. . | |
| 56-133634 | 10/1981 | Japan | 250/338.3 |
| 61-173124 | 8/1986 | Japan | 250/332 |
| 63-65328 | 3/1988 | Japan | 250/332 |
| 63-282621 | 11/1988 | Japan | 250/338.3 |

OTHER PUBLICATIONS

Charles Hanson and Howard Beratan, *Uncooled Pyroelectric Thermal Imaging*, Proceedings of the Ninth IEEE International Symposium on Applications of Ferroelectrics, U.P., PA.;Aug. 7–Oct. 1994, pp. 657–661.

Bernard M. Kulwicki and Ahmed Amin, *Pyroelectric Thermal Imaging*, Proceedings of the 1992 IEEE International Symposium on Applications on Ferroelectrics; Attleboro, MA, Aug. 30–Sep. 2, 1992, pp. 1–10.

(List continued on next page.)

*Primary Examiner*—Edward J. Glick
*Attorney, Agent, or Firm*—Leonard A. Alkov; William C. Schubert; Glenn H. Lenzen, Jr.

[57] ABSTRACT

A low cost infrared camera (1) for night vision. The camera (1) is disposed within a housing (2) having an infrared transmissive window (6) disposed at an input aperture (5) thereof. A compact optical arrangement (10) is disposed within the housing (2) to focus energy from the window (5) onto a focal plane array (20). A chopper disk (19) is positioned between the reflective optical arrangement (10) and the focal plane array (20) to establish a reference level for the array (20) and to facilitate a sequential readout thereof. A signal processing circuit (100) is included for processing the output of the array (20) for display on a standard video screen. Thus, the problems with uncooled detectors are overcome by use of a fast optical system in combination with an uncooled detector. The fast optical system provides a high signal level to the uncooled detector, thereby compensating for losses in collection of thermal radiation. Reflective optical systems can be manufactured inexpensively from plastic or aluminum and reduce the need for expensive infrared materials commonly used in military systems. The combination of the fast optics and uncooled detector provides a truly low cost thermal camera for night vision.

6 Claims, 7 Drawing Sheets

OTHER PUBLICATIONS

R. Calvin Owen, *Easily Fabricated Wide Angle Telescope*, Proceedings of the SPIE International Lens Design Conference, Bellingham, Washington, 1990, pp. 430–433.

Abel, Hatch, *The Pursuit of Symmerty in Wide-Angle Reflective Optical Designs*, Proceedings of the International Lens Design Conference, Oakland, May 31, 1980–Jun. 4, 1980; pp. 271–280.

Harold A. Zahl and Marcel J. E. Golay, "Pneumatic Heat Detector" *The Review of Scientific Instruments*, vol. 17, No. 11 Nov. '46, pp. 511–515.

F. Le Carvennec, "Recherche d'un Dispositif Nouveau de Television Thermique" Thomason–CSF, Paris, France, 1974, pp. 265–272.

Thomson–CSF, "TH X840 1" Pyricon Infra–Red Pick–up Tube for Thermal T–V, Jan., 1973.

Thomson–CSF, "TH 9840 1" Pyricon® Infrared Pick–Up Tube for Thermal TV Sep. 1976.

Fischer, "Design Considerations For A Reflective IR Imager", SPIE vol. 226, Infrared Imaging Systems Technology, 1980, pp. 83–90.

Blackburn et al, "A Thermal Imaging System Using A Pyroelectric Detector Array", IEE Conf. Low Light And Thermal Imaging, Pub. No. 124, p. 201, 1975.

Altenhof, "The Design of a Large Aperture Infrared Optical System", Optical Engineering, vol. 15, No. 4, 1976, pp. 364–367.

LOW COST NIGHT VISION CAMERA

This is a continuation of application Ser. No. 08/232,893, filed Apr. 12, 1994, now abandoned.

BACKGROUND OF THE INVENTION

1. Field of the Invention

The present invention relates to imaging systems. More specifically, the present invention relates to night vision systems which sense thermal radiation emitted from an object of interest.

2. Description of the Related Art

Night vision systems are well known in the art. Night vision systems typically include a cryogenically cooled linear detector array with an associated cryogenic subsystem, a scanning subsystem which moves a two-dimensional field across the linear array and a refractive optical subsystem which focuses energy onto the detector. The cryogenic coolers typically use liquid cryogenic gases, closed cycle cooler systems or a 3–6 stage thermal cooler to operate in typical ambient environments. The detectors in the array sense the emitted heat of the object of interest.

While these systems have been used extensively for military applications, the high cost of the scanning, cooling and optical systems associated therewith has heretofore limited the applicability of same for numerous other applications.

Uncooled detectors are inherently low cost since they operate at room temperature and, therefore, do not require expensive and unreliable cryogenic coolers. However, uncooled detectors are not as sensitive as cryogenically cooled detectors. Previous uncooled detectors operating at room temperatures cannot produce clear images of thermal scenes.

Accordingly, there has been a need in the art for a low cost night vision system. In particular, there is a need in the art for a low cost night vision system which provides clear images of thermal scenes provided by uncooled detectors.

SUMMARY OF THE INVENTION

The need in the art is addressed by the present invention which provides a low cost camera for night vision systems. In a most general sense, the inventive camera includes a two-dimensional focal plane array of uncooled detectors and an optically fast, optical arrangement for focusing energy onto the array. The optical arrangement has a fast speed (typically below f/1.4). In the illustrative embodiment, a reflective optical arrangement is from the wide angle, large reflective unobscured system (WALRUS) family as it provides a large aperture, low cost infrared imaging optical system. A reflective triplet is the preferred approach to narrow field of view applications where higher magnification is required.

Thus, the problems with uncooled detectors are overcome by use of a fast optical system in combination with an uncooled detector. The fast reflective optical system provides a large thermal flux to the uncooled detector, partially compensating for the lower sensitivity of the thermal detector. Reflective optical systems can be manufactured inexpensively from plastic or aluminum and reduce the need for expensive infrared materials (e.g., germanium and silicon) commonly used in military systems. The combination of the fast optics and uncooled detector provides a truly low cost thermal camera for night vision.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1B:
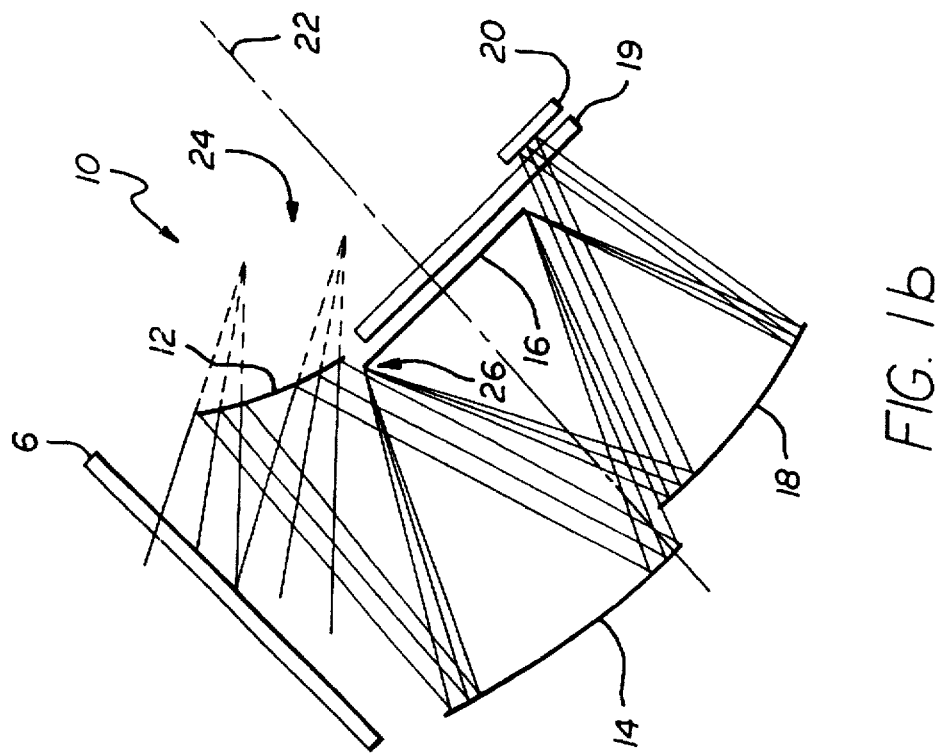
FIG. 1b is a side view illustrative of the compact optical arrangement of the inventive camera.
Figure 1A:
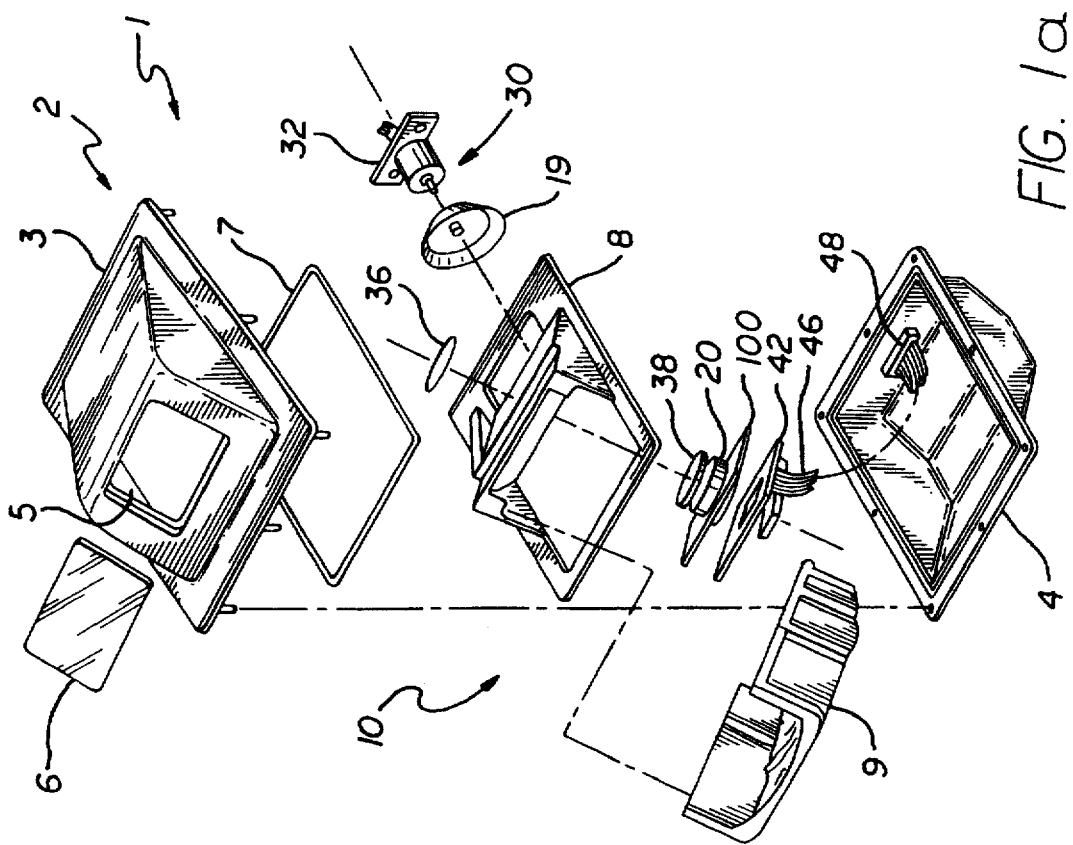
FIG. 1a is a perspective view of an illustrative embodiment of the inventive camera in disassembled relation.

FIG. 1a is a perspective view of an illustrative embodiment of the inventive camera 1 in disassembled relation. The camera 1 includes a housing 2 having an upper portion 3 and a lower portion 4. The upper portion 3 has a rectangular aperture 5 therethrough into which an infrared transmitting window 6 is fitted. The infrared transmitting window 6 protects the camera from contaminants. In the preferred embodiment, the infrared window 6 is constructed in accordance with the teachings of U.S. patent Ser. No. 08/232,897 filed Apr. 22, 1994.

A seal 7 is interposed between the upper part of the housing 3 and the lower part of housing 4. The subhousing, consisting of upper and lower parts 8 and 9, supports a compact reflective optical arrangement 10.

FIG. 1b is a side view illustrative of the compact reflective optical arrangement of the inventive camera. The compact reflective optical arrangement is disclosed and claimed in U.S. Pat. No. 5,331,470, the teachings of which are incorporated herein by reference. As disclosed therein, the arrangement 10 includes a primary mirror 12, a secondary mirror 14, a fold mirror 16, and a tertiary mirror 18. The mirrors 12–18 (even numbers only) focus energy received through the window 6 onto a two-dimensional focal plane array 20 of uncooled detector elements. Thus, the camera 1 stares. The primary mirror 12 has an axis 22 defining the system optical axis. The primary mirror 12 is a negative power mirror having a surface which is aspheric. The primary mirror 12 is mounted in the subhousing upper part 8.

The secondary mirror 14 is a positive power mirror and has a surface which is aspheric.

The fold mirror 16 is mounted in the subhousing 8 and is optically interposed between the secondary mirror 14 and the tertiary mirror 18. The fold mirror 16 is a nonpowered mirror having a nonplanar, preferably aspheric surface.

The tertiary mirror 18 is a positive power mirror, the surface of which is also aspheric.

The power of the two positive powered mirrors 14 and 18 is balanced by the negative power of the primary mirror 12 to provide a zero Petzval curvature or a flat field condition.

The primary and secondary mirrors 12 and 14 form a non-reimaging afocal telescope of the Galilean type at an afocal magnification of approximately 2×. Additionally, these two mirrors 12 and 14 relay a virtual entrance pupil 24 located behind the primary mirror 12 to a real aperture stop 26. At the aperture stop 26, the fold mirror 16 is positioned to receive the beam from the secondary mirror 14 and reflect the beam to the tertiary mirror 18. The secondary and tertiary mirrors are disposed on the inner surface of a cap 9. The tertiary mirror 18 focuses and directs the beam to the detector array 20 via a chopper disk 19.

The arrangement 10 is from the WALRUS family, since it is a non-relayed three-mirror form with a mirror power distribution of negative, positive, positive used on-axis in aperture and off-axis in field. By locating the fold mirror 16 between the secondary mirror 14 and the tertiary mirror 18, the optical path is folded back with the secondary mirror 14 and tertiary mirror 18 adjacent to one another. The length of the arrangement 10 is reduced and the packaging of the optics for the application is considerably improved. Also, by locating the system aperture stop 26 at the fold mirror 16, and applying an aspheric surface departure to the fold mirror 16, the spherical aberration of the arrangement 10 is easily corrected, even for very fast optical speeds. The three power mirrors 12, 14 and 18 of the telescope together with the fold mirror 16 form a compact optical system which provides a wide two-dimensional field of view and a very fast optical speed. Fields of view exceeding 20° by 40° can be achieved simultaneously with optical speeds as fast as F/1.0.

The high optical speeds afforded by the present invention are made possible by the use of a large aperture in both the vertical and horizontal planes. In the illustrative embodiment, the field of view is at least 13.5° vertical by 27° horizontal. Since the aperture growth in the vertical plane must be accompanied by an increase in the field of view offset to avoid interference, greater aperture growth can be achieved in the horizontal plane.

The folding of the optical train between the secondary and tertiary mirrors 14 and 18 at the system aperture stop 26 provides for a compact arrangement. Also, the fold mirror 16 includes higher order aspheric coefficients which correct the spherical aberration. Further, the optical speed of the arrangement 10 is increased by the use of a large, non-circular aperture and by increasing the offset of the field of view to accommodate the larger aperture.

For higher magnification applications, an alternative reflective triplet design form is preferred such as described in U.S. Pat. No. 4,240,707 entitled ALL-REFLECTIVE THREE ELEMENT OBJECTIVE, issued Dec. 23, 1980 to Wetherell et al., the teachings of which are also incorporated herein by reference. An alternative high speed refractive optical design form may also be used for further reduction in optical compactness.

In the illustrative embodiment, the focal plane array 20 is fabricated with a plurality of high-performance pyroelectric devices such as the uncooled detectors made of barium-strontium-titanate (BST) manufactured and sold by Texas Instruments. This detector converts infrared energy into an electrical signal without the aid of an expensive cryogenic cooler subsystem that is typically inherent in conventional high-performance night vision imaging systems.

The characteristics of the detectors utilized in the illustrative embodiment are shown in Table I below:

TABLE I

| Parameter | Value | Comment |
| --- | --- | --- |
| Detector resolution | | |
| Horizontal pixels | 328 | |
| Vertical pixels | 164 | |
| NETD (°C.) | ≦0.1 | Average detector NET |
| Modulation transfer function | | Static square wave response at Nyquist frequency converted to MTF |
| Axial | ≧0.2 | Best-phase line spread function at video output |
| Off-axis | ≧0.15 | Area excluding central 20 percent of field of view |

In the table, "NET" refers to noise equivalent temperature and the axial and off-axis modulation transfer functions (MTF) are dimensionless measures of system fidelity reported as a function of spatial frequency that is expressed in units of lines per millimeter. As a person skilled in the art could readily appreciate, the values in Table I are merely exemplary, and detectors having performances that depart from the high-performance values above may still be used. (See also U.S. Pat. No. 4,080,532 entitled FERROELECTRIC IMAGING SYSTEM, issued Mar. 21, 1978 to G. S. Hopper; U.S. Pat. No. 5,010,251 entitled RADIATION DETECTOR ARRAY USING RADIATION SENSITIVE BRIDGES, issued Apr. 23, 1991 to J. Grinberg et al.; U.S. Pat. No. 5,021,663 entitled INFRARED DETECTOR, issued Jun. 4, 1991 to L. J. Hornbeck; U.S. Pat. No. 5,034,608 entitled INFRARED SENSOR OPERABLE WITHOUT COOLING, issued Jul. 23, 1991 to L. S. Tavrow et al.; and U.S. Pat. No. 5,288,649 entitled METHOD FOR FORMING UNCOOLED INFRARED DETECTOR, issued Nov. 22, 1994 to W. Keenan, all of which are incorporated herein by reference.

A temperature controller (not shown) may be used to maintain the array at room temperature. The temperature controller might include a thermoelectric element thermally coupled to the detector array, a temperature transducer, a voltage reference, and an error amplifier. These form a feedback loop which regulates the detector temperature. The thermoelectric element would be used to either heat or cool the detector array depending on the ambient temperature.

The uncooled detectors of the illustrative embodiment are most sensitive to thermal contrasts modulated at a predetermined range of frequencies. This modulation of the scene, called "chopping" is accomplished by a rotating optical element phased to provide a thermal differential to each element in the array during each revolution. The chopping momentarily focuses, then removes, the thermal scene from the detector element, allowing for a comparison of the scene with the known reference of the chopper disk 19. Accordingly in the illustrative embodiment, a mechanical chopper 30 is used to modulate the energy incident on the detector array 20.

Returning to FIG. 1a, the chopper 30 includes the disk 19 and a motor 32. The chopper facilitates the sequential readout of the array 20 and aids in the establishment of a DC reference level for the array 20 which is representative of the average DC level of the scene. The chopper operates at a 30 hertz rate. The disk 19 is fabricated from optical-grade silicon. See U.S. Pat. No. 4,227,210 entitled RADIATION SHUTTERS, issued Oct. 7, 1980 to R. D. Nixon, the teachings of which are incorporated herein by reference. See also GB 2,240,000 entitled THERMAL-RADIATION DETECTION SYSTEMS AND OPTICAL CHOPPERS, published Jul. 17, 1991 in the name of A. A. Turnbull.) A suitable alternative detector, for example, would be a silicon microbolometer detector fabricated by Hughes Aircraft Company; Honeywell, Inc.; or Loral.

A signal processing system 100 processes the output of the array 20 for display on any standard video screen. In addition, irregularities in the outputs of the detectors across the array 20 in response to a test pattern are corrected by the system 100. The system 100 provides power to the chopper motor 32 and is itself powered by a power supply 42. The power supply 42 is connected to external circuitry such as a display (not shown) by a cable 46 through a port 48. Input power is converted into the required secondary voltages for use within the camera 1.

Figure 1C:
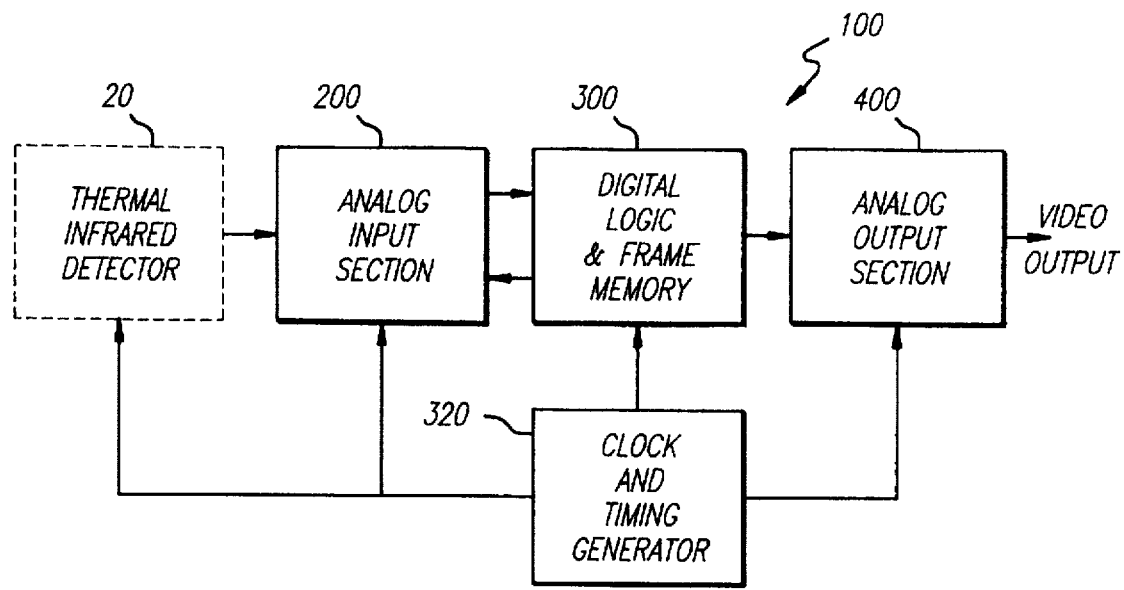
FIG. 1c is a block diagram of the signal processing system of the present invention.

FIG. 1c is a block diagram of the signal processing system 100 of the present invention. The thermal infrared detector 20 is shown in phantom. Each detector has an amplifier (not shown) associated therewith in a semiconductor circuit bonded to the back of the array 20 which provides an output signal indicative of a change in thermal energy incident on the detector. The amplifier outputs are scanned by a multiplexer providing a serial analog output from the array 20.

As mentioned above, the chopping momentarily focuses, then diffuses, the thermal scene from the detector element, allowing for a comparison of the scene with the average value of the scene. The result is a first output from the detector amplifier pair which represents the detection of energy from a focused scene and a second output which is a signal of equal and opposite polarity which represents the output of the detector amplifier resulting from the detector seeing the diffused scene. These two fields constitute a single frame.

The signal processing circuit 100 of FIG. 1c receives these signals from the array 20 and corrects each pixel for sensitivity and offset. Then it offsets and scales the video signal to match the dynamic range of an analog-to-digital converter which converts the video signal to digital form. The signal processing circuit 100 includes an analog input section 200, a digital logic circuit 300, a timing circuit 320 and an analog output section 400.

Figure 2A:
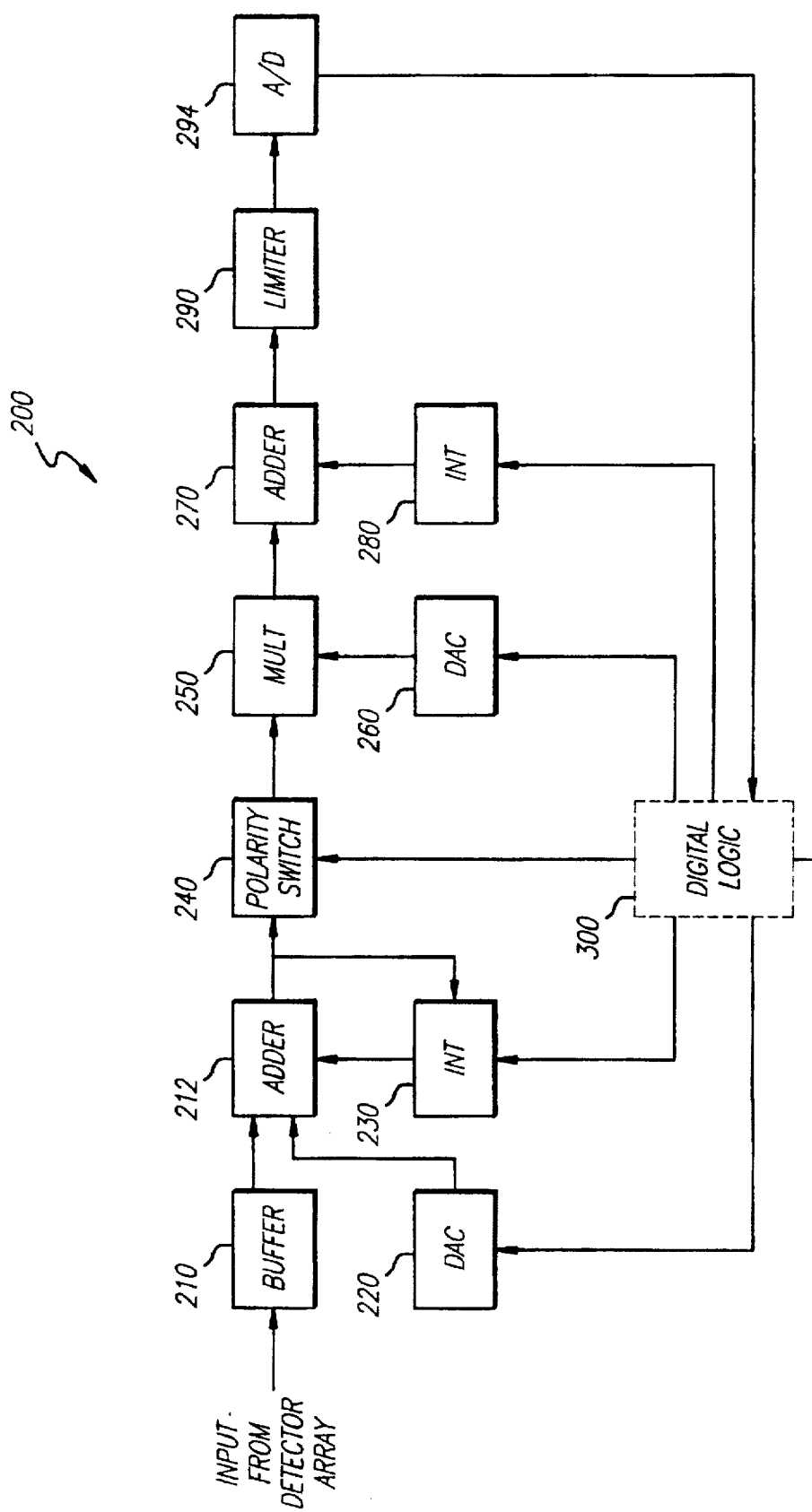
FIG. 2a is a block diagram of the analog input section of the signal processing system of the present invention.
Figure 2B:
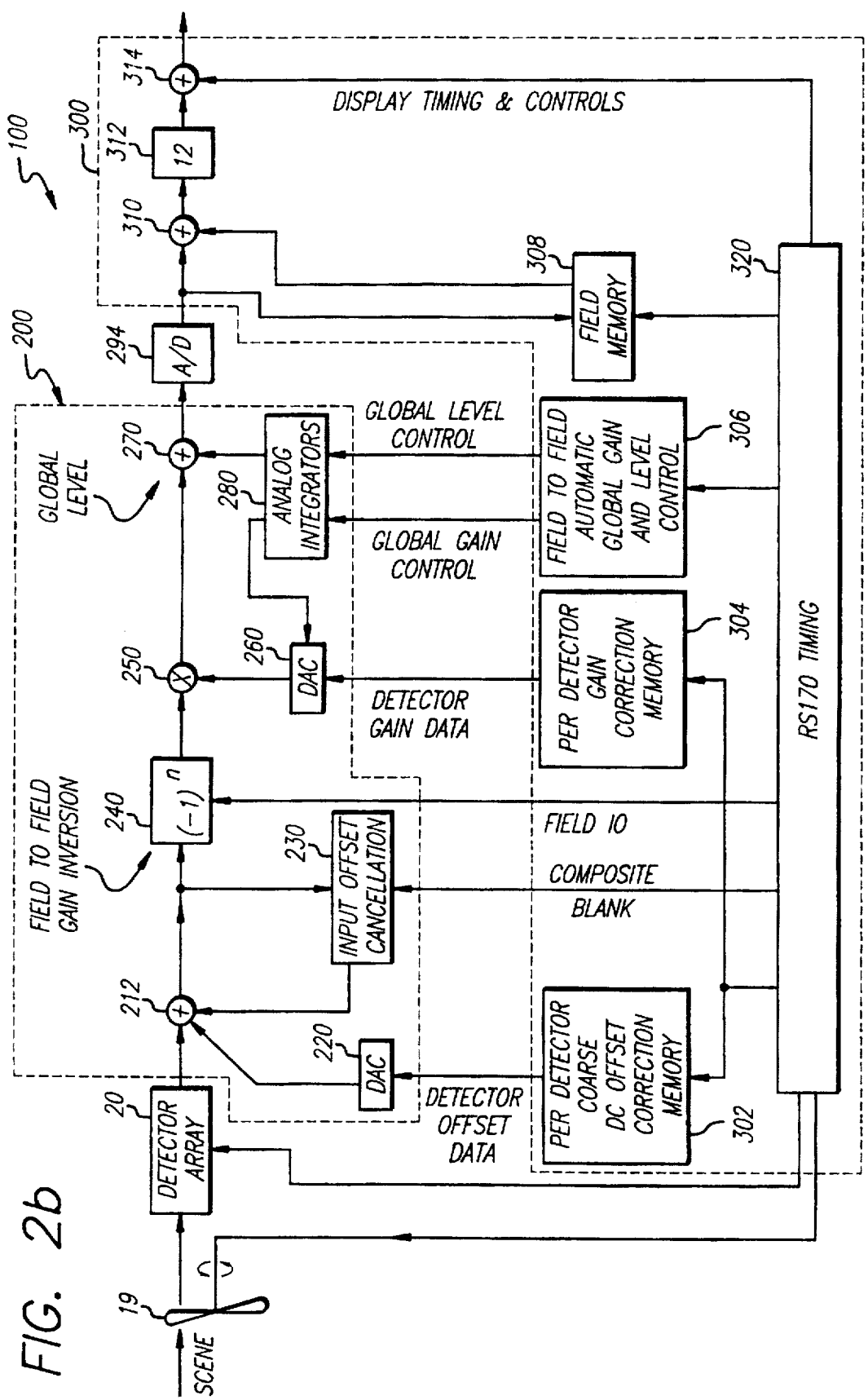
FIG. 2b is a simplified block diagram of the analog input section and the digital signal processing section.

FIG. 2a is a block diagram of the analog input section 200. FIG. 2b is a simplified block diagram of the analog input section and the digital signal processing section 300. A serial video signal is brought in from the infrared detector array 20. As mentioned above, the video signals consist of the two fields of alternating polarity separated by inactive intervals and offset by a DC level. This signal is passed through a buffer amplifier 210 and applied to a first adder circuit 212. The adder 212 has three inputs: the video signal, an individual pixel offset signal from a first digital-to-analog converter (DAC) 220, and a feedback signal from a first integrator circuit 230.

In accordance with the present teachings, in a calibration mode, a uniform cold reference pattern is used to illuminate the array while the outputs are scanned into the field memory 308 of a digital logic section 300. In the preferred embodiment, the inventive digital logic section 300 is implemented with a field programmable gate array with firmware stored in a programmable read-only memory (PROM). However, those skilled in the art will appreciate that the circuit 100 may be implemented in software in a microprocessor or implemented in hard-wired logic circuits without departing from the scope of the present invention. The output of each detector should be zero. As discussed more fully below, offset correction signals for the nonzero detector outputs are stored in digital form in a detector coarse DC offset correction memory 302 in the digital logic circuit 300. These signals are used for offset correction of the instantaneous signals output by each detector via a DAC 220 and an adder 212.

Figure 3:
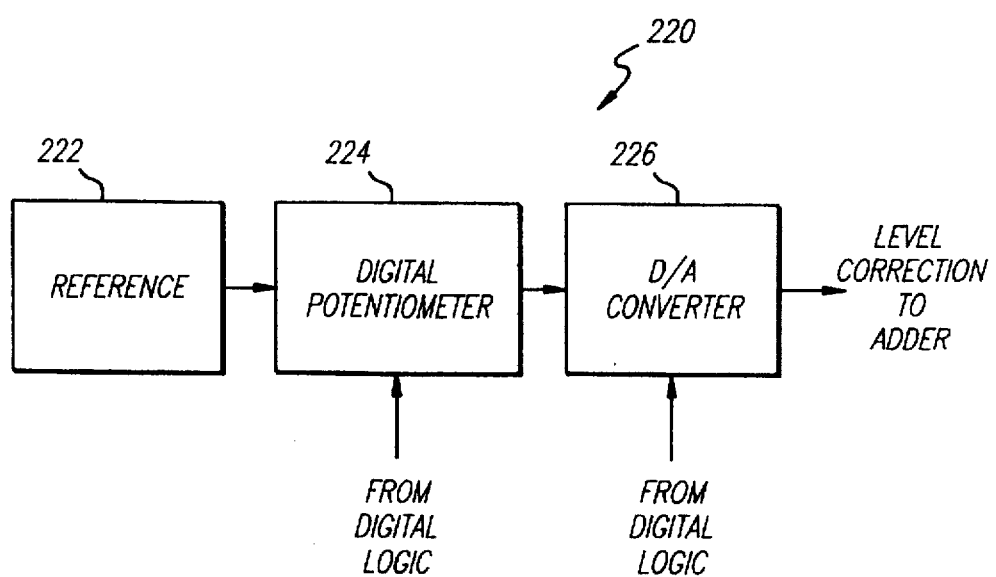
FIG. 3 is a block diagram of an illustrative implementation of a first digital-to-analog converter of the analog section of the signal processing system of the present invention.

FIG. 3 is a block diagram of an illustrative implementation the DAC 220. A source of reference potential 222 provides a reference signal to a digital potentiometer 224. Since the range of offset correction required varies from detector to detector, the range of the digital-to-analog converter 226 is matched to each detector by the digital potentiometer 224, whereupon, the digital-to-analog converter 226 converts the stored offset correction signals to an analog output signal for input to the adder 212.

The integrator 230 averages several successive fields and drives the sum to zero to eliminate the average offsets. The first integrator 230 cancels the DC offset of the input signal and performs a function similar to AC coupling with a long time constant. That is, the average value of the active period is set to zero by integrating the video and feeding the result back into the first adder circuit 212.

Figure 4:
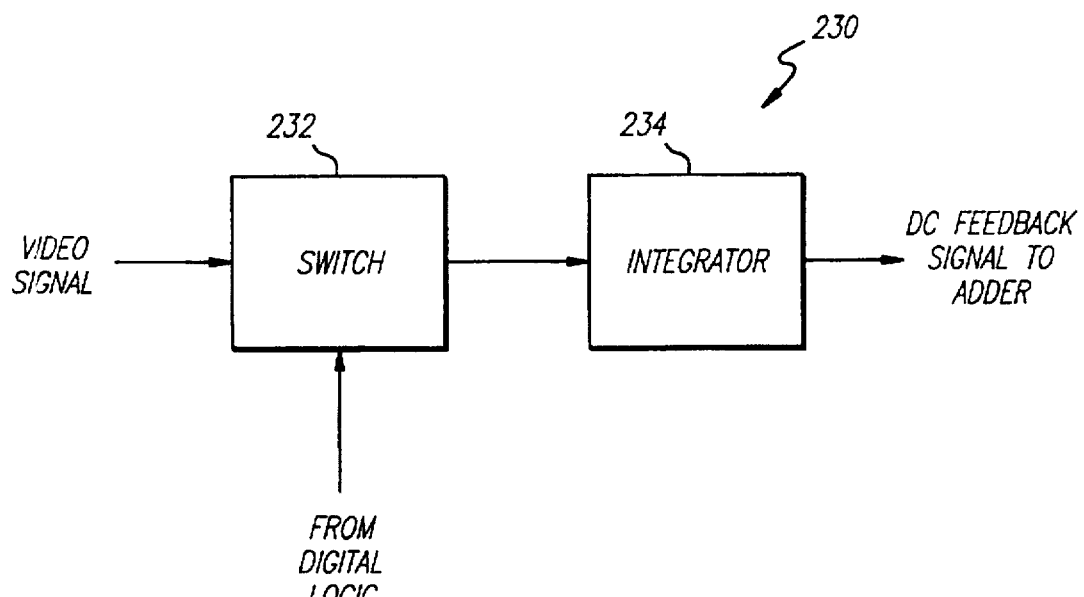
FIG. 4 is a block diagram of an illustrative implementation of a first integrator circuit of the analog section of the signal processing system of the present invention.

FIG. 4 is a block diagram of an illustrative implementation of the first integrator circuit 230. The switch 232 receives a blanking signal from a timing circuit 320. The RS-170 display controller timing circuit 320 provides timing for the system suitable for the RS-170 video format. The blanking signal serves to disable the integrator 234 during inactive periods in the video signal.

Figure 4A:
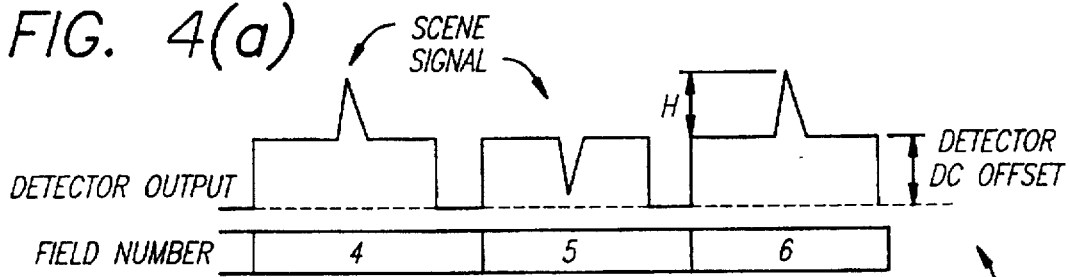
FIG. 4(a) is a waveform illustrating the output of a typical pyroelectric detector.
Figure 4B:
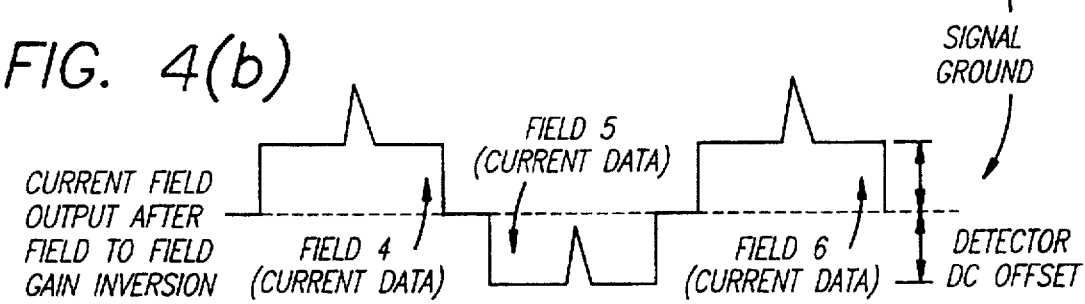
FIG. 4(b) is a waveform illustrating a the waveform of FIG. 4(a) after field-to-field gain inversion in accordance with the present teachings.

Returning to FIG. 2b, the output of the adder 212 is input to a unity gain inversion circuit or polarity switch 240 which operates under control of the RS-170 timing circuit 320. The polarity switch 240 is implemented with analog switches. The input/output waveform of the polarity switch 240 is shown in FIGS. 4(a)–4(b). As discussed more fully below, a significant feature of the present invention derives from the inversion of alternating fields of the output of each detector by the unity gain inversion circuit 240. This facilitates field to field subtraction which effectively cancels DC offset in each field while preserving the AC signal for subsequent processing.

Figure 4C:
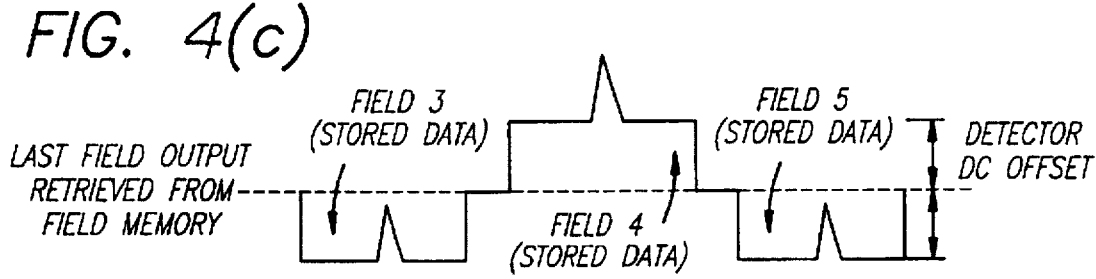
FIG. 4(c) illustrates a previous field of output from a pyroelectric detector.
Figure 4D:
FIG. 4(d) is a waveform illustrating the output after a summation of the waveforms shown in FIGS. 4(b) and 4(c).

FIG. 4(a) is a waveform illustrating the output of a typical pyroelectric detector. FIG. 4(b) is a waveform illustrating a the waveform of FIG. 4(a) after field-to-field gain inversion in accordance with the present teachings. FIG. 4(c) illustrates a previous field of output from a pyroelectric detector. FIG. 4(d) is a waveform illustrating the output after a summation of the waveforms shown in FIGS. 4(b) and 4(c).

As mentioned above, the chopper 19 chops the scene at the field rate so that there is a detector output every field. See FIG. 4(a). The polarity switch 240 effects field-to-field gain inversion in such a way that for the even fields (n=0, 2, 4, 6, . . . ), the resulting output equals (1) times the detector output and for the odd fields (n=1, 3, 5, . . . ), the resulting output equals (−1) times the detector output. See FIG. 4(b). Then the inverted signal is digitized by the analog-to-digital converter 294. Alternating fields are stored in a field memory 308. Data from a previous field (field n−1) (FIG. 4(c)) is retrieved from the field memory 308 and summed with the current field (field n) to cancel the DC bias in each field (FIG. 4(d)). As shown in FIG. 4(d), after summing fields n−1 and n together in the adder 310, the detector DC bias is canceled, but the resulting detector scene signal is doubled.

A second step in the calibration process involves the illumination of the array 20 with a uniform warm reference pattern. The outputs of the detectors should be equal. The equal and nonequal outputs are digitized and gain correction signals are calculated and stored in a gain correction memory 304 in the digital logic circuit 300 and used for sensitivity correction via a multiplier 250 and a second DAC circuit 260.

Figure 5:
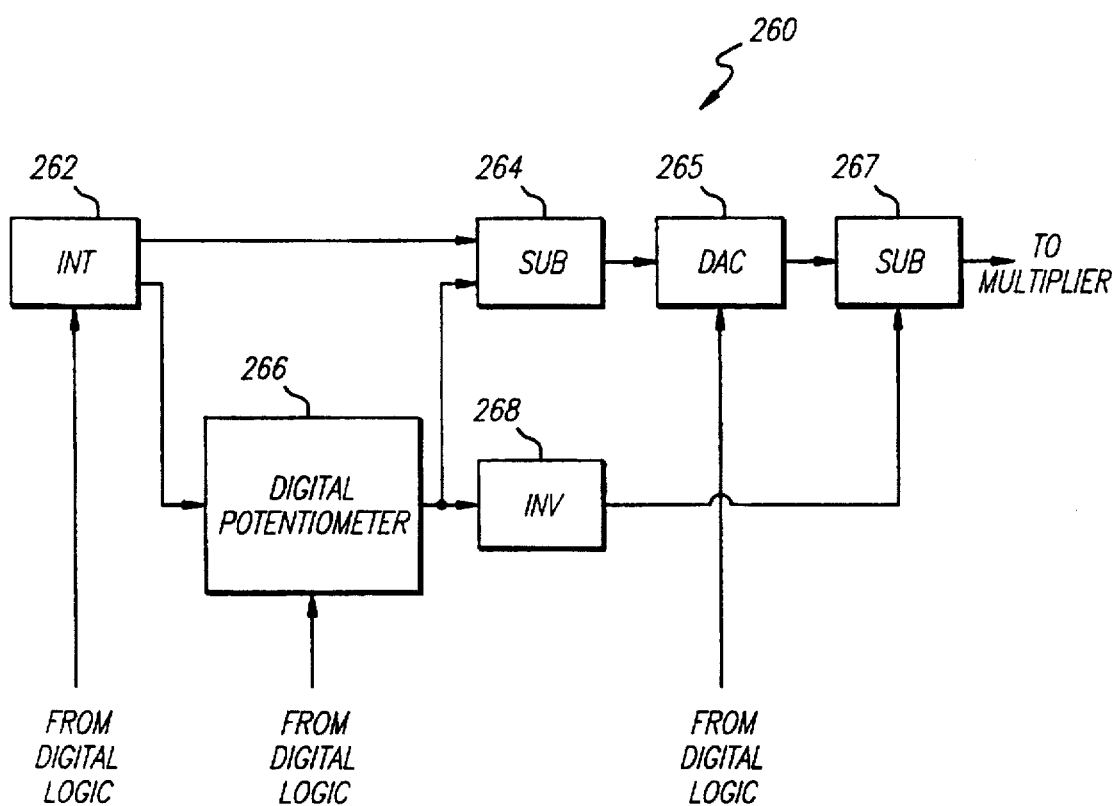
FIG. 5 is a block diagram of an illustrative implementation of a second digital-to-analog converter of the analog section of the signal processing system of the present invention.

FIG. 5 is a block diagram of an illustrative implementation of the DAC circuit 260. The integrator 262 integrates pulses from the digital logic circuit 300 to create a voltage level proportional to the desired video gain. This controls the global gain applied to the detector with the weakest signal output. This gain factor is reduced to a minimum value for the detector with the strongest output in sensitivity calibration. The range of gain control is set by a digital potentiometer 266. The integrator 262 and the potentiometer 266 feed a subtractor circuit 264 which in turn provides an input signal to a multiplying D/A (digital-to-analog) converter 265 which sets intermediate levels. As the range of the D/A converter is reduced, a complementary DC level is added to the output by an inverter 268 and a subtractor 267 to keep the full scale output of the multiplier 250 constant.

Returning to FIG. 2b, in addition to a limiter 290, two feedback loops are used to control the dynamic range of the signal going into the A/D (analog-to-digital) converter 294. The output of the A/D converter is fed to a field-to-field automatic global gain and level control section 306 in the digital logic circuit 300. The field-to-field automatic global gain and level control circuit 306 compares the digitized signal to upper and lower threshold values. If the digital value is above the upper threshold, a high level is output to an offset integrator 280. If the value is below the lower threshold, a low level is sent to the integrator 280. Levels between the thresholds tri-state the output to the integrator resulting in no signal from the digital logic section 300. This output is also tri-stated during inactive video periods. The integrator 280 is referenced to a voltage midway between the two logic levels. The result is that equal numbers of pixels will fall above the upper threshold and below the lower threshold. This provides automatic global level control across the array 20.

Automatic gain control may be effected in accordance with any one of a number of schemes which are well known in the art. In the preferred embodiment, automatic gain control is provided by generating a high level when the signal is outside the thresholds previously described, a low level when it is within the thresholds, and tri-state when the video is inactive. This is fed to the integrator 262 of FIG. 5 and compared to a reference that is a fraction of the logic level (10% for example). The result is that most of the pixels (90%) will fall between the thresholds and a few pixels (10%) will be above or below the thresholds.

Thus, as depicted in FIG. 1c, the digital signals from the analog input section 200 are processed by digital logic section 300 and stored in its frame memory. The digital output from the digital logic 300 is converted to standard video format (typically RS 170) by an analog output section 400.

Figure 6:
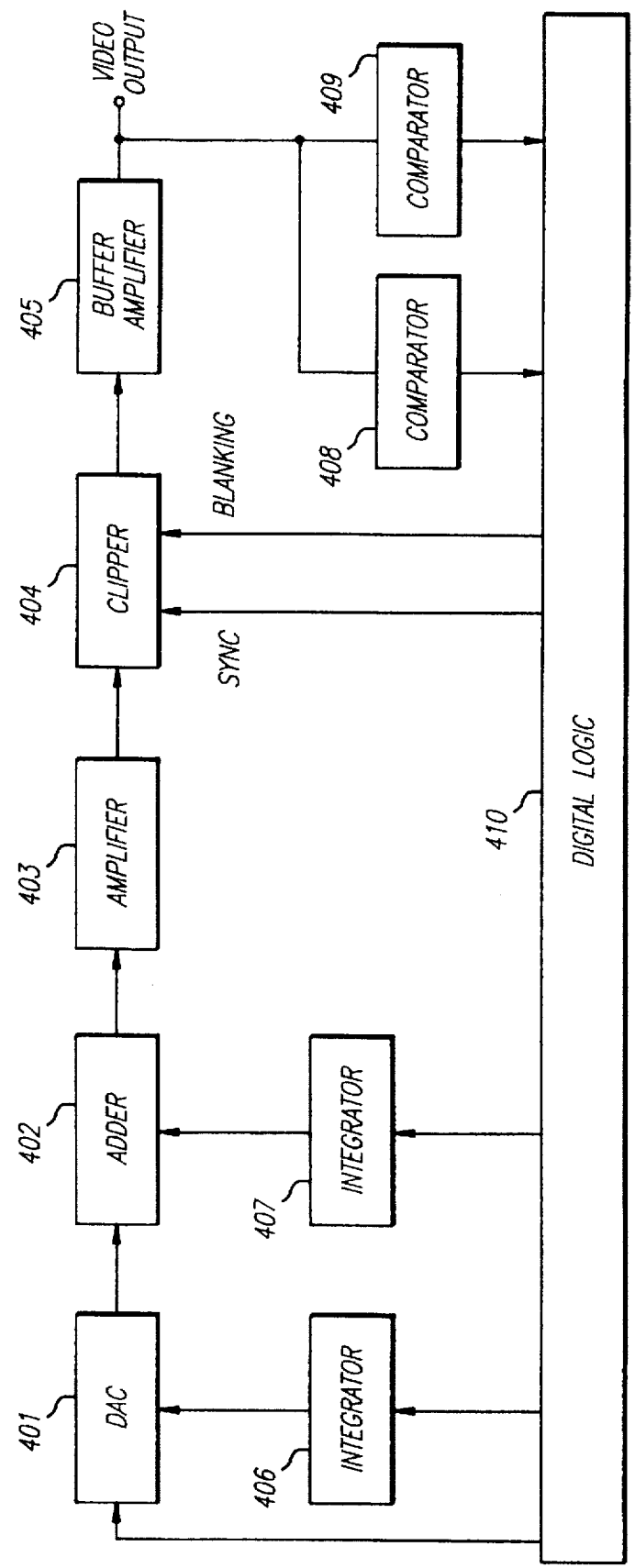
FIG. 6 is a block diagram of an illustrative implementation of the analog output section of the signal processing system of the present invention.

FIG. 6 is a block diagram of an illustrative implementation of the analog output section 400. The video signal comes from the digital logic section 300 as successive pixel values. These digital signals are converted to analog form by a DAC 401. The scale factor of these signals is varied by using the output of an integrator 406 as the reference voltage for the DAC 401. A second integrator 407 is used to supply an offset voltage which is added to the DAC output in an adder stage 402. The output of the adder is then amplified in an amplifier stage 403 to the final output level desired. The video signal is then combined with sync and blanking pulses from the digital logic using a clipper circuit 404. The clipper circuit 404 is arranged such that the most negative signal passes to its output. The sync signal is adjusted such that its negative excursion is below the blanking and video signals and its positive excursion is above the video signal range. The blanking signal is adjusted such that its negative level is below the video range but above the negative sync level and its positive level is above the video signal range. When the sync signal is negative, the output is at the sync level regardless of the blanking and video signal levels. When the sync signal is positive and the blanking level is negative, the output is at the blanking level regardless of the video level. When both the sync and blanking signals are positive, the output follows the video signal. A buffer amplifier 405 provides the output current necessary to drive the load (typically 75 ohms) placed on the circuit. Feedback may be applied around the amplifier clipper and buffer stages to control their overall gain.

The comparators 408 and 409 are used to detect when the output exceeds the middle of video range (408) or falls outside two thresholds set near the limits of the video range 409.

The automatic level control operates by using the digital logic to gate the output of the midpoint comparator 408 with the blanking pulse. The output of the digital logic is open circuited (tri-state) during the blanking periods. It is low when the video is below the midpoint value and high if the video is above the midpoint value. This signal is integrated by an integrator 407 which is referenced to a voltage midway between the high and low logic levels. The output of the integrator controls the offset added to the video signal. An equilibrium condition is established where half of the pixels are above midscale and half are below.

The other comparator 408 is a window comparator with limits set near the limits of the video range (typically at 10% and 90% of the video range). The automatic gain control operates by using digital logic to gate the window comparator with the blanking pulse. The output of the digital logic is open circuited (tri-state) during the blanking periods. It is low when the video signal is within the window and high when the video signal is outside the window. This signal is integrated by an integrator 406 which is referenced to a voltage that is a fraction of the digital logic voltage (typically 5%). The output of the integrator varies the reference voltage of the DAC 401. This forms a feedback loop that reaches an equilibrium condition when 95% of the pixels fall between the 10% and 90% levels of the video range.

While these circuits may be implemented in a manner well within the ability of one of ordinary skill in the art, in the preferred embodiment, the circuits disclosed and claimed in U.S. patent application Ser. Nos. 08/226,796 filed Apr. 12, 1994, and 08/226,588 filed Apr. 12, 1994, the teachings of which are incorporated herein by reference, would be used for the illustrative application.

Thus, in accordance with the present teachings, the problems with uncooled detectors are overcome by use of a fast optical system in combination with an uncooled detector. The fast optical system provides a high thermal flux to the uncooled detector, thereby compensating for the low sensitivity of the thermal detector. Reflective optical systems can be manufactured inexpensively from plastic or aluminum and reduce the need for expensive infrared materials (e.g., germanium) commonly used in military systems. The combination of the fast optics and uncooled detector provides a truly low cost thermal camera for night vision.

The present invention has been described herein with reference to a particular embodiment for a particular application. Those having ordinary skill in the art and access to the present teachings will recognize additional modifications applications and embodiments within the scope thereof. For example, the invention is not limited to the reflective optical arrangement shown nor to the use of detectors in the array implemented with barium-strontium-titanate. Other optical arrangements and other detector materials may be used without departing from the scope of the present teachings. For example, in lieu of a pyroelectric detector, the uncooled detector may be implemented with a silicon microbolometer such as that disclosed and claimed in U.S. Pat. No. 5,300,915 entitled "Thermal Sensor" and assigned to Honeywell.

It is therefore intended by the appended claims to cover any and all such applications, modifications and embodiments within the scope of the present invention.

Accordingly,

What is claimed is:

1. A night vision camera comprising:

a housing having an upper portion, a lower portion and a subhousing disposed therebetween, said subhousing having upper and lower parts, said lower art comprising a cap, and said upper portion having an aperture therethrough;

a window disposed on the housing at the aperture, the window being transmissive to infrared energy;

an array of uncooled detectors disposed within the housing, each detector providing an electrical output signal when illuminated with radiant electromagnetic energy;

a reflective optical arrangement disposed within the subhousing for focusing energy from the aperture onto the array, the optical arrangement including:

a primary mirror mounted in the upper part of the subhousing and having an aspheric surface and a negative power for reflecting energy from the aperture, a secondary mirror mounted on an inner surface of said cap and having an aspheric surface and a positive power for reflecting energy from the primary mirror, a fold mirror for reflecting energy from the secondary mirror, and a tertiary mirror mounted on an inner surface of said cap and having an aspheric surface and a positive power for focusing and redirecting energy from the fold mirror to the array;

a chopper disk disposed within said housing in optical alignment and between said tertiary mirror and said array;

means disposed within said housing for actuating said chopper disk; and signal processing means disposed within said housing for processing an electrical output signal from the array.

2. The invention of claim 1 wherein the power of the secondary and tertiary mirrors is balanced by the negative power of the primary mirror to provide a zero Petzval curvature or flat field condition.

3. The invention of claim 1 wherein the primary and secondary mirrors form a non-reimaging afocal telescope of the Galilean type at an afocal magnification of approximately 2×.

4. The invention of claim 1 wherein the primary and secondary mirrors relay a virtual entrance pupil located behind the primary mirror to a real aperture stop.

5. The invention of claim 4 wherein the fold mirror is positioned at the aperture stop to receive the energy from the secondary mirror and reflect the energy to the tertiary mirror.

6. The invention of claim 1 wherein the reflective optical arrangement is a non-relayed three-mirror arrangement with a mirror power distribution of negative, positive, positive used on-axis in aperture and off-axis in field.

* * * * *